United States Patent [19]
Yoo

[11] Patent Number: 5,929,320
[45] Date of Patent: Jul. 27, 1999

[54] APPARATUS AND METHOD FOR JUDGING DETERIORATION OF CATALYSTS DEVICE AND OXYGEN CONTENT SENSING DEVICE

[75] Inventor: Seong-Beom Yoo, Kyungki-do, Rep. of Korea

[73] Assignee: Hyundai Motor Company, Seoul, Rep. of Korea

[21] Appl. No.: 08/602,774

[22] PCT Filed: Mar. 16, 1995

[86] PCT No.: PCT/KR95/00022

§ 371 Date: Mar. 4, 1996

§ 102(e) Date: Mar. 4, 1996

[87] PCT Pub. No.: WO96/28646

PCT Pub. Date: Sep. 19, 1996

[51] Int. Cl.⁶ .................................................. G01M 15/00
[52] U.S. Cl. .................... 73/23.31; 73/118.1; 60/277; 701/109
[58] Field of Search .................... 60/276, 277; 73/23.31, 73/23.32, 116, 118.1; 701/103, 108, 109

[56] References Cited

U.S. PATENT DOCUMENTS

| | | | |
|---|---|---|---|
| 5,165,230 | 11/1992 | Kayanuma et al. | 73/118.1 |
| 5,214,915 | 6/1993 | Schneider et al. | 73/118.1 |
| 5,282,383 | 2/1994 | Kayanuma | 73/118.1 |
| 5,303,580 | 4/1994 | Schneider et al. | 73/118.1 |
| 5,388,454 | 2/1995 | Kuroda et al. | 73/118.1 |
| 5,522,250 | 6/1996 | Gee et al. | 73/118.1 |

*Primary Examiner*—George Dombroske

[57] ABSTRACT

An apparatus and a method for judging the deterioration state of a catalyst device and an oxygen content sensing device are disclosed, in which virtual signals are generated to accurately determine the deterioration state of the catalyst device and the oxygen content sensing device by utilizing theoretical oxygen content sensing signals which are calculated in accordance with the operation state of automobiles.

19 Claims, 10 Drawing Sheets

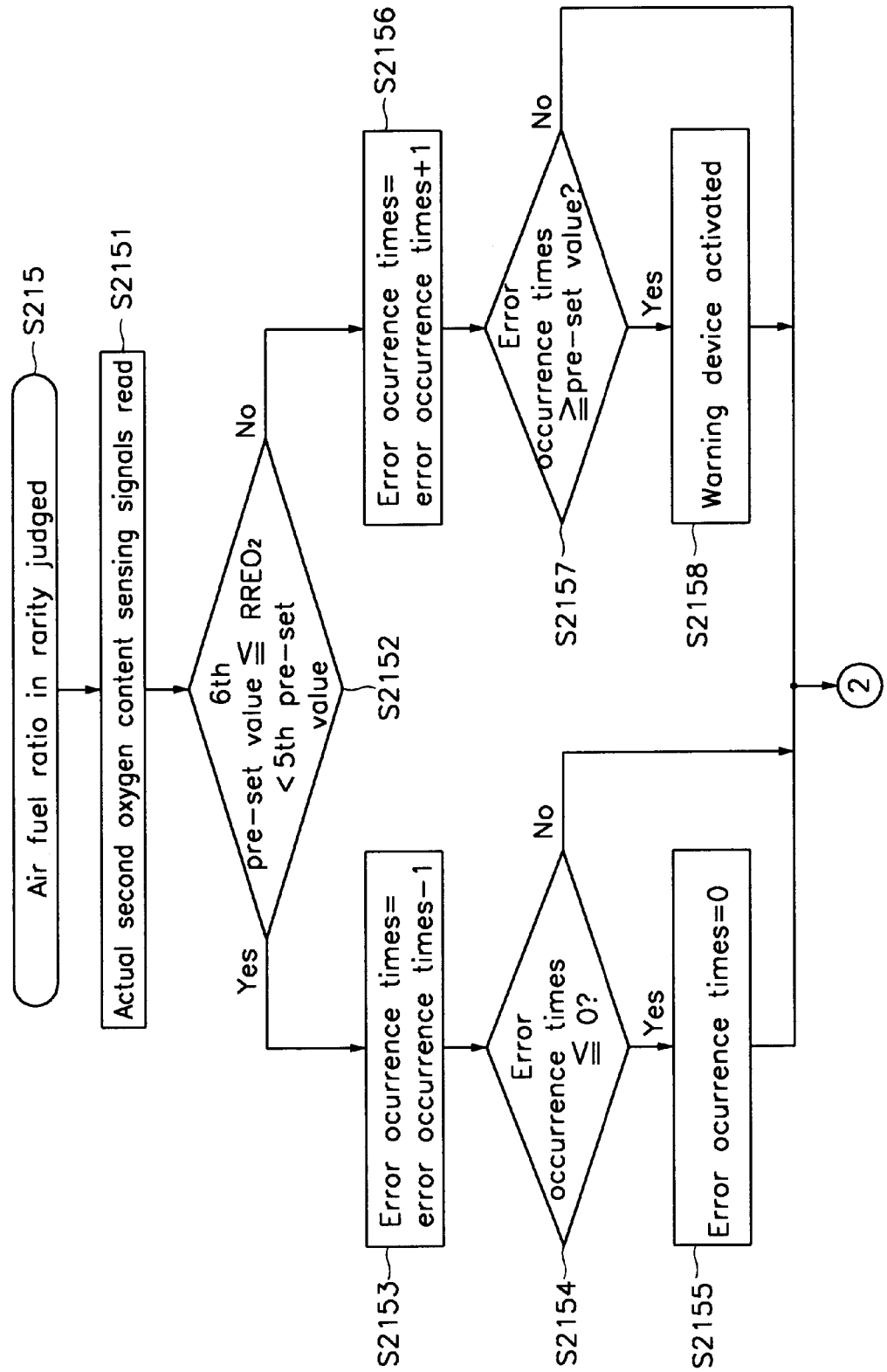

APPARATUS AND METHOD FOR JUDGING DETERIORATION OF CATALYSTS DEVICE AND OXYGEN CONTENT SENSING DEVICE

BACKGROUND OF THE INVENTION

1. Field of the Invention

The present invention relates to an apparatus and a method for judging the deterioration of a catalyst device and an oxygen content sensing device, in which virtual signals are generated to accurately judge the deterioration state of the catalyst device and the oxygen content sensing device by utilizing theoretical oxygen content sensing signals which are calculated in accordance with the operation state of automobiles.

2. Description of the Prior Art

Generally, in automobiles, the exhaust gas which is discharged after combustion of fuel includes harmful materials. In order to purify the harmful materials, a catalyst device is installed. Further, an oxygen content sensing device is installed for sensing the oxygen content in the exhaust gas so as to assess the air fuel ratio.

Thus, the discharge of the harmful materials is reduced by the action of the catalyst device, and the air fuel ratio in an automobile in operation is made to be accurately computed owing to the oxygen content sensing device.

In this case, if the air fuel ratio is corrected in accordance with oxygen content in the exhaust gas, then the efficiency of the catalyst device can be improved, and the fuel consumption can also be improved.

However, in the case where the air fuel ratio is corrected, the oxygen content sensing device and the catalyst device for inhibiting the discharge of harmful materials can be deteriorated due to the high temperature of the exhaust gas. Thus if the catalyst device and the oxygen content sensing device are damaged to malfunction, then the air fuel ratio cannot be accurately corrected.

Conventionally, in order to solve the above described problem, the deterioration state of the catalyst device and the oxygen content sensing device are judged, so that the air fuel ratio can be accurately corrected.

The conventional method for judging the deterioration of the catalyst device and the oxygen content sensing device will be described below.

Conventionally, a first method for judging the deterioration of the catalyst device is as follows. That is, the profusion or rarity state of the air fuel ratio, which can be judged by means of two oxygen content sensing signals which are utilized at pre-set time intervals, are counted as to its inverting times, thereby calculating an inverting frequency. The inverting frequency which is thus calculated is subjected to the calculation of an average value over a predetermined time interval. Then this value is compared with the judged deterioration value, thereby judging the deterioration of the catalyst device (utilizing the frequency ratio).

In the above described frequency ratio method, the operation conditions for the judgment of deterioration are as follows.

(1) During the time when the air fuel ratio feedback control is carried out.

(2) When the oxygen content sensor is in activation.

(3) When the output signals of an intake air sensing device lies below a pre-set level.

(4) When an idle switch is turned off.

(5) When the pre-set time has elapsed after satisfying the conditions (1) to (4).

Conventionally, a second method for judging the deterioration of the catalyst device is constituted as follows. That is, two oxygen content sensing signals are utilized to compare a pre-set value with the magnitude of the amplitudes of the sensing signals. Thus if the magnitude of the amplitudes of the sensing signals exceeds the pre-set value, then it is decided that the catalyst device has been deteriorated.

In the second method, the operation conditions for judging the deterioration are as follows.

(1) When the fuel injecting operation is not cut off.

(2) When the automobile is not put to a full load.

(3) When the air fuel ratio feedback is being controlled.

(4) When the calculated temperature of the exhaustion gas is above the pre-set level.

(5) When the oxygen content sensing device is not in an abnormal state.

(6) When a certain time has elapsed after releasing an operation prohibition.

Conventionally, a third method for judging the deterioration of the catalyst device is as follows. That is, the pre-set value and an integrated value of the oxygen content sensing signals are compared with each other so as to judge the deterioration of the catalyst device. If the integrated value is larger than the pre-set value which is set in accordance with the load state of the engine, then the catalyst device is judged to have been deteriorated.

In the above described third method, the operation conditions for judging the deterioration are as follows.

(1) When the engine speed and the temperature of the cooling water are less than the pre-set values.

(2) When the temperature of the exhaust gas is more than the pre-set value.

(3) When the automobile is not in an excessive state.

Conventionally, by using the above methods and under the above described conditions, the state of the deterioration of the catalyst device was judged, so that the air fuel ratio could be accurately maintained.

Now the conventional methods for judging on the deterioration state of the oxygen content sensing device will be described.

A first conventional method for judging the deterioration of the oxygen content sensing device is constituted as follows. That is, among the oxygen content sensing devices, when the one which is disposed in front of the catalyst device is subjected to an air fuel ratio variation for detecting the deterioration degree, the respondability of the oxygen content sensing device is utilized to make the evaluation.

In this method, during the control of the air fuel ratio feedback, a monitoring is carried out after elapsing of the setting time and after satisfying the setting conditions of engine revolution speed, volume efficiency and water temperature. If the setting conditions are not satisfied, the judging operation is terminated.

A second conventional method for judging the deterioration of the oxygen content sensing device is as follows. The variation period in which the air fuel ratio is varied to a profusion or to a rarity is measured, and thus the responding degree of the measured signals are evaluated, thereby judging the deterioration state of the oxygen content sensing device.

In the above described second method, the operation conditions for judging the deterioration degree are as follows.

(1) A region in which the oxygen content sensing device lying in the rear of the catalyst device can be controlled.

(2) A state in which the catalyst device has no abnormality.

(3) A state in which the interval for checking the operation state is irrelevant.

(4) The judgment is made after the elapsing of a certain time period from the satisfying of the above setting conditions.

A third conventional method for judging the deterioration of the oxygen content sensing device is as follows. That is, when the air fuel ratio control value is varied, the respondability of the oxygen content sensing device is judged so as to judge the deterioration of the oxygen content sensing device. Thus when the engine speed, the load state and the temperature of the cooling water satisfy the set conditions, and when a closed loop condition is relevant, the state of the oxygen content sensing device is judged.

As described above, conventionally the operating conditions of the catalyst device and the oxygen content sensing device are judged based on the various methods.

However, in the above described conventional judging methods, in the case where the operating state of the catalyst device is judged, the signals of the oxygen content sensing device which is disposed in front of the catalyst device are utilized. Therefore, if an abnormality occurs in the oxygen content sensing device which is disposed in front of the catalyst device, then the operating state of the catalyst device cannot be correctly judged.

SUMMARY OF THE INVENTION

The present invention is intended to overcome the above described disadvantages of the conventional techniques.

Therefore it is the object of the present invention to provide an apparatus and a method for judging the deterioration of a catalyst device and an oxygen content sensing device, in which virtual signals are utilized so that theoretical virtual oxygen content sensing signals can be calculated, thereby judging the deteriorations of the catalyst device and the oxygen content sensing device.

In achieving the above object, the apparatus for judging a deterioration of a catalyst device according to the present invention includes:

cooling water temperature sensing means for sensing a cooling water temperature and outputting the sensed temperature in a form of electrical signals;

throttle valve opening degree sensing means for sensing a throttle opening degree and outputting the sensed throttle opening degree in a form of electrical signals;

engine revolution speed sensing means for sensing an engine revolution speed and outputting the sensed engine revolution speed in a form of electrical signals;

a catalyst device for purifying harmful exhaust gases into non-harmful gases based on oxidizing and reducing reactions;

second oxygen content sensing means, installed on an exhaust tube behind the catalyst device, for judging a deterioration of the catalyst device, and for sensing an oxygen content of the exhaust gas which has passed through the catalyst device and outputting the sensed oxygen content in a form of electrical signals;

automobile velocity sensing means for sensing an automobile velocity and outputting electrical signals corresponding to the automobile velocity;

an idle switch for sensing an idle state of an engine and outputting the sensed idle state in a form of electrical signals;

engine control means for reading the electrical signals supplied from the sensing means and from the idle switch, and for judging an initial engine cooling water temperature, to judge as to whether an automobile state satisfies pre-set conditions throughout pre-set times, and to judge an operating state of the catalyst device by utilizing the electrical signals of the second oxygen content sensing means and virtual oxygen content sensing signals based on pre-set data in accordance with an automobile running state; and warning means, connected to the engine control means, for responding to signals outputted in accordance with an operating state of the catalyst.

In achieving the above object, the method for judging a deterioration of a catalyst device according to the present invention includes the steps of:

setting profusion and rarity adjusting parameters for an air fuel ratio by judging an elapsed time to judge a state of a catalyst device, and for judging amplitudes and frequencies of signals based on data set in accordance with a state of an automobile;

calculating virtual oxygen content sensing signals relevant to a pre-set period of time by utilizing a pre-set value;

judging air fuel ratio profusion/rarity adjusting parameters, to determine whether a state of an air fuel ratio is in a normal range, in profusion or in rarity; and judging actual oxygen content sensing signals of a second oxygen content sensing means, and determining whether a range of the actual oxygen content sensing signals exists within a range set in accordance with a state of the air fuel ratio, to decrement a number of error occurrences by "1" if it exists within the pre-set range, and to increment the number of the error occurrences by "1" if it is not within the pre-set range.

In achieving the above object, the apparatus for judging a deterioration of an oxygen content sensing device according to the present invention includes:

cooling water temperature sensing means for sensing a cooling water temperature and outputting the sensed cooling water temperature in a form of electrical signals;

throttle valve opening degree sensing means for sensing a throttle valve opening degree and outputting the sensed throttle valve opening degree in a form of electrical signals;

engine revolution speed sensing means for sensing an engine revolution speed and outputting the sensed engine revolution speed in a form of electrical signals;

a catalyst device for purifying harmful exhaustion gases discharged through an exhaust tube into non-harmful gases based on oxidizing and reducing reactions;

first oxygen content sensing means, installed on a discharge tube in front of the catalyst device, for outputting relevant signals by sensing an oxygen content of exhaust gases for an air fuel ratio feedback control operation;

automobile velocity sensing means for sensing an automobile velocity and outputting electrical signals relevant to the automobile velocity;

an idle switch for sensing an idle state of an engine and outputting the sensed idle state in a form of electrical signals;

engine control means for reading the electrical signals supplied from the sensing means and from the idle switch, and for judging an initial engine cooling water temperature, to determine whether an automobile state satisfies pre-set conditions throughout pre-set times, and to judge an operating state of the first oxygen content sensing means by utilizing the electrical signals of the first oxygen content sensing means and by utilizing calculated virtual oxygen content sensing signals based on pre-set data in accordance with an automobile running state; and warning means, connected to the engine control means, for responding to signals outputted in accordance with an operating state of the first oxygen content sensing means.

In achieving the object, the method for judging a deterioration state of an oxygen content sensing means according to the present invention includes the steps of:

setting profusion and rarity adjusting parameters for an air fuel ratio, and setting amplitudes and frequencies of signals based on data set in accordance with a state of an automobile;

setting relevant oxygen content sensing signals by utilizing the pre-set signals if the preset time has not passed, and judging an operation state of a first oxygen sensing means, if the pre-set time has passed, a passing number of an air fuel ratio profusion and rarity judging line of first oxygen content sensing signals being within a pre-set range;

executing an air fuel ratio feedback control by utilizing pre-set virtual oxygen content sensing signals, and measuring signals outputted from the first oxygen content sensing means;

measuring the passing number of times of the air fuel ratio profusion and rarity judging line of the first oxygen content sensing signals, and measuring a maximum value and a minimum value of the first oxygen content sensing signals; and determining whether the maximum value and the minimum value of the first oxygen content sensing signals come within pre-set ranges, decrementing error occurrence times by "1" if the values comes within the pre-set ranges, and incrementing the error occurrence times by "1" if the values do not come within the pre-set ranges, whereby the first oxygen content sensing means is judged to be in an abnormal state upon finding that the error occurrence times exceeds a pre-set value.

BRIEF DESCRIPTION OF THE DRAWINGS

The above object and other advantages of the present invention will become more apparent by describing in detail the preferred embodiment of the present invention with reference to the attached drawings in which:

FIGS. 3A to 3E are flow charts showing a method for judging the deterioration of the catalyst device by utilizing the virtual signals according to the present invention.

DESCRIPTION OF THE PREFERRED EMBODIMENTS

Figure 1:
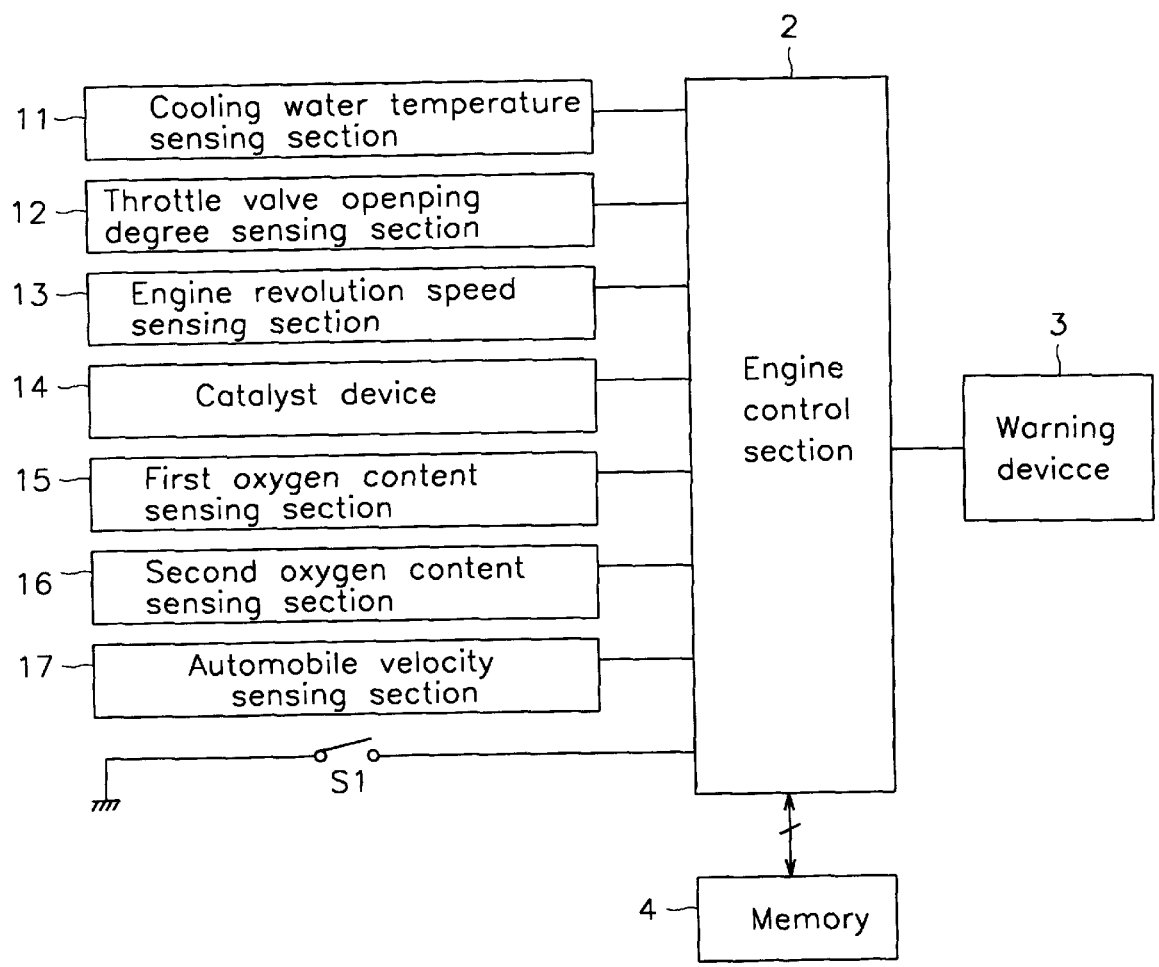
FIG. 1 is a block diagram showing a catalyst device and the oxygen content sensing device utilizing the virtual signals according to the present invention.

FIG. 1 is a block diagram showing the catalyst device and the oxygen content sensing device utilizing the virtual signals according to the present invention.

As shown in FIG. 1, the apparatus for judging a deterioration of a catalyst device according to the present invention includes:

a cooling water temperature sensing section 11 for sensing a cooling water temperature and outputting relevant electrical signals;

a throttle valve opening degree sensing section 12 for sensing a throttle valve opening degree and outputting relevant electrical signals;

an engine revolution speed sensing section 13 for sensing an engine revolution speed and outputting relevant electrical signals;

a catalyst device 14 installed on an exhaust tube for purifying harmful exhaustion gases;

a first oxygen content sensing section 15 installed in front of the catalyst device 14 to output relevant signals by sensing an oxygen content of exhaust gases before the operation of the catalyst device 14;

a second oxygen content sensing section 16 installed behind the catalyst device for sensing an oxygen content of the exhaust gas to output it in a form of electrical signals after the operation of the catalyst device 14;

an automobile velocity sensing section 17 for sensing an automobile velocity and outputting electrical signals relevant to the automobile velocity;

an idle switch S1 for sensing an idle state of an engine and outputting the sensed idle state in a form of electrical signals so as to make it possible to judge an idle state;

an engine control section 2 for calculating the virtual oxygen content sensing signals relevant to the operation state by reading the electrical signals supplied from the sensing sections 11–16 and from the idle switch S1, and for judging on an operating state of the catalyst device 14 and the first oxygen content sensing device 15 and outputting relevant control signals; and a warning section 3 for making it possible to recognize the operation states of the catalyst device 14 and the first oxygen content sensing section 15 by being operated in accordance with the control signals from the engine control section 2.

The apparatus for judging on the deterioration of the catalyst device and the oxygen content sensing device by utilizing the virtual signals according to the present invention operates in the manner described below.

First, in order to calculate the virtual oxygen content sensing signals, the frequency and amplitude of the relevant signals which are outputted in accordance with the engine revolution speed and the load state are stored into a memory 4.

Therefore, when an air fuel ratio feedback operation is carried out in accordance with the virtual oxygen content sensing signals which satisfy the pre-set conditions for judging the operation states of the catalyst device and the oxygen content sensing device, the engine control section 2 determines the deterioration state of the catalyst device by utilizing the signals of the second oxygen content sensing section 16 which is disposed behind the catalyst device 14. Then the virtual oxygen content sensing signals are compared with the signals of the first oxygen content sensing section 15 which is disposed in front of the catalyst device 14, and thus, the deterioration state of the first oxygen content sensing section 15 which is disposed in front of the catalyst device is determined.

At first, the engine control section 2 reads the output signals of the cooling water temperature sensing section 11, the throttle valve opening degree sensing section 12 and the engine revolution speed sensing section 13 (S101), and then, the values of the variables to be utilized are initialized (S102).

Then, the engine control section 2 judges on the cooling water temperature which has been sensed at the initial stage of the engine start (S103).

Then, the engine control section 2 makes a judgment as to whether the conditions for the execution of operation for judging on the deterioration states of the catalyst device 14 and the first oxygen content sensing section 15 are satisfied. That is, a judgment is made as to whether currently the air fuel ratio feedback control is being carried out, and whether the fuel injection has been cut off.

Under this condition, the fact that the air fuel ratio feedback control is being carried out indicates that the automobile system operates in a normal manner. Therefore, when the air fuel ratio feedback control operation is being carried out, the operation states of the catalyst device and the oxygen content sensing device are determined.

If the automobile state satisfies the above described conditions, then the engine control section 2 determines whether the engine cooling water temperature as sensed by the cooling water temperature sensing section 11 is higher than the pre-set temperature (S105). If it is higher than the pre-set temperature, then the difference between the current opening degree of the throttle valve and the former opening degree of the throttle valve as sensed by the throttle valve opening degree sensing section 13 is calculated. Then, a variation amount (ΔTPSi) of the opening degree of the throttle valve is calculated (S106).

Then the variation amount (ΔTPSi) of the throttle valve thus calculated is compared with the pre-set value (S107), and if it is smaller than or equal to the pre-set value, then the engine control section 2 determines the current revolution speed (RPMTi) by utilizing the read-out engine revolution speed sensing signals (S108)

Then, the engine control section 2 converts the read-out engine revolution speed signals based on Formula 1 for searching an accurate optimum running velocity of an automobile (S109).

$$RPMTi=(FC/256\times(RPMTi-RPMTi-1)+RPMTi-1 \tag{1}$$

where RPMTi−1 represents the engine revolution speed of the former state, and FC represents a filter constant.

In order to judge the conditions for carrying out the deterioration judging operation based on Formula 1, the signals of the engine revolution speed RPMTi are converted into a more exact form. Then the engine control section 2 calculates a difference between the calculated engine revolution speed of the current stage and the calculated engine revolution speed of the former stage, thereby obtaining the variation amount ΔRPMTi of the engine revolution speed (S110).

Then, the calculated engine revolution speed variation amount ΔRPMTi is compared with a pre-set value (S111), and, if the engine revolution speed variation amount ΔRPMTi is smaller than or equal to the pre-set value, then the engine control section 2 utilizes the idle switch S1 and the automobile velocity sensing section 17 to determine whether the automobile is not in an idle state, and the automobile velocity is not "0" (S112).

In the case where the automobile is not in an idle state, but is running at a certain speed, the engine control section 2 sets a variable K to "1" (S113). Then at the start of the automobile after a stop, the engine control section 2 increments by "1" the operation condition satisfying times NCONT(n) which is set in accordance with the engine cooling water temperature (S114).

However, if the automobile is in an idle state, and the running velocity is "0", the engine control section 2 sets the value of the variable K to "2" (S115), and increments the operation condition satisfying times NCONT(n) by "1" (S116).

Then the engine control section 2 determines whether the operation condition satisfying times NCONT(n) which has been incremented by "1" is larger than or equal to a pre-set value (S117). If it is larger than or equal to the pre-set value, the engine control section 2 determines whether the value of the variable K is "1" or "2" (S118).

If the operation condition satisfying times NCONT(n) is smaller than the pre-set value, the engine control section 2 leaps to a condition satisfaction judging step (S104) in which the engine control section 2 determines whether an air fuel ratio control is being carried out, and whether the fuel is being supplied into the cylinders. Then a judgment is made as to whether the pre-set operation conditions are being satisfied, and this judgment is continued until the operation condition satisfaction times NCONT(n) which has been set in accordance with the engine cooling water temperature at the start of the engine is satisfied.

The operation condition satisfying times NCONT(n) is for realizing that the catalyst device 14 is sufficiently warmed up so as to be operated in the normal manner. Further the operation condition satisfying times is set differently with sufficient times for a sufficient warming-up at the normal temperature in accordance with the engine cooling water temperature at the start of the engine.

Therefore, in cold winter seasons, a sufficient warming up is not done after the start of the engine, with the result that the catalyst device cannot perform an, accurate operation. In this case, the deterioration state of the catalyst device is judged, and thus, erroneous judgment in which a normal catalyst device is judged to be an abnormal one can be prevented.

Meanwhile, then the operation condition satisfying times NCONT(n) is larger than the pre-set value, if the judged value of the variable K is "1", the engine control section 2 judges on the state of the catalyst device 14 based on the relevant conditions (S200).

However, if the value of the variable K is "2", the engine control section 2 judges the state of the first oxygen content sensing section 15 based on the judgment conditions for the first oxygen content sensing device 15 which is disposed in front of the catalyst device 14 (S300).

As described above, if the respective pre-set conditions which are set in accordance with the engine cooling water temperature at the start of the engine are satisfied, then the deterioration states of the catalyst device 14 and the first oxygen content sensing section 15 are judged based on the pre-set conditions.

Now the operations for judging the deterioration state of the catalyst device 14 will be described referring to FIGS. 3A to 3E.

If the operation for judging the state of the catalyst device 14 is progressed, the engine control section 2 judges the deterioration state of the catalyst device 14 after a certain set time has elapsed (S201).

The reason why the state of the catalyst device 14 is judged after elapsing of a certain time period is as follows.

That is, a judgment is made as to whether the running velocity of the automobile makes it possible to judge the deterioration of the catalyst device in a continuous manner. After the satisfaction of the conditions, if the operation conditions are not satisfied due to a variation of the automobile velocity, an erroneous judgment is prevented.

Therefore, when the pre-set time has elapsed, the engine control section 2 sets an amplitude and frequency for calculating virtual oxygen content sensing signals IMO2 by utilizing the data which have been set in accordance with the engine revolution speed and the running state of the automobile (S202).

Then, the engine control section 2 utilizes an air fuel ratio profusion/rarity adjusting parameter CONST(i) to arbitrarily vary the level of the virtual oxygen content sensing signals IMO2, so that the state of the air fuel ratio would be varied to a profusion/rarity state. Then, in order to determine whether the control signals are outputted in an accurate manner in accordance with the state of the varied air fuel ratio, the state of the catalyst device 14 is judged, and then, the elapsed time t is compared with a first setting time t1 (S203).

If the elapsed time is shorter than the first setting time t1, the engine control section 2 sets the value of the air fuel ratio profusion/rarity adjustment parameter CONST(i) to CONST(1) (S204).

However, if the elapsed time t is not shorter than the first setting time t1, the engine control section 2 determines whether the elapsed time t is longer than the first setting time t1, and whether the elapsed time t is shorter than a second setting time t2 (S205).

If the elapsed time t satisfies the pre-set conditions, the engine control section 2 sets the value of the air fuel ratio profusion/rarity control parameter CONST(i) to CONST(2) (S206).

However, if the elapsed time t does not satisfy the above conditions, the engine control section 2 determines whether the elapsed time t is equal to or longer than the second setting time t2, and as to whether it is shorter than a third setting time t3 (S207).

If the elapsed time t satisfies the above conditions, the engine control section 2 sets the value of the air fuel ratio adjustment parameter CONST(i) to CONST(3) (S208). On the other hand, if the above conditions are not satisfied, the engine control section 2 leaps to step S104 of FIG. 2A to determine whether the operation conditions are satisfied.

After carrying the judgment operations for the state of the catalyst device 14, the engine control section 2 sets the value of the air fuel ratio profusion/rarity adjustment parameter CONST(i) in accordance with the elapsed time t. Thus the virtual oxygen content sensing signals IMO2 which show the normal air fuel ratio are shifted to rarity oxygen content sensing signals IMO2 and profusion oxygen content sensing signals IMO2 by adjusting the levels of the signals.

If the profusion/rarity adjustment parameter CONST(i) is set, the engine control section 2 utilizes Formula 2 to calculate the virtual oxygen content sensing signals IMO2 of the first oxygen sensing section 15 (S209).

$$IMO2 = AM \times \sin(Hz \times n + CONST(i)) \quad (2)$$

where AM represents the magnitude of the amplitude of the virtual oxygen content sensing signals, Hz represents the frequency of the virtual oxygen content sensing signals, n represents a time variable, and CONST(i) represents the air fuel ratio profusion/rarity adjustment parameter.

The air fuel ratio profusion/rarity adjustment parameter CONST(i) is set to a relevant value in accordance with the pre-set value.

When theoretical virtual oxygen content sensing signals IMOS are calculated through the above procedure, the engine control section 2 increments the time variable n by "1" (S210), so that the virtual oxygen content sensing signals IMO2 can be calculated continuously during the pre-set time period.

Then, the engine control section 2 terminates the operation of controlling the air fuel ratio in accordance with the actual oxygen content sensing signals. Then the engine control section 2 utilizes the calculated virtual oxygen content sensing signals IMOS to begin a control operation for the air fuel ratio (S211), and determines the value of the pre-set air fuel ratio profusion/rarity adjustment parameter CONST(i) (S212).

Therefore, when an air fuel ratio feedback control operation is carried out based on the virtual oxygen content sensing signals IMO2, a judgment is made as to whether the second oxygen content sensing section 16 outputs signals for correcting the air fuel ratio in the normal manner suitable to the state of the air fuel ratio which is varied in accordance with the elapsing of time.

Then, if the value of the air fuel ratio adjustment parameter CONST(i) is CONST(1), the engine control section 2 makes a judgment as to whether the second oxygen content sensing section 16 outputs oxygen content sensing signals corresponding to the normal state in accordance with the feedback control operation for the normal air fuel ratio virtual oxygen content sensing signals IMO2 (S213).

If the value of the air fuel ratio control parameter CONST(i) is CONST(2), it indicates that the virtual oxygen sensing signals IMO2 have been shifted from the normal state to a profusion state. Therefore, the engine control section 2 determines whether the second oxygen content sensing section 16 outputs actual oxygen content sensing signals corresponding to the variation of the air fuel ratio (S214).

If value of the air fuel ratio control parameter CONST(i) is CONST(3), it indicates that the virtual oxygen content sensing signals IMO2 have been shifted from the normal state to a rarity state. Therefore, the engine control section 2 makes a judgment as to whether the second oxygen content sensing section 16 outputs a small amount of actual sensing signals corresponding to the variation of the state of the air fuel ratio. Thus a judgment is made as to whether the catalyst device 14 is carrying out the operation in the normal manner.

As described above, when all the relevant control operations have been carried out in accordance with the judged states of the air fuel ratio, the engine control section 2 determines the state of the catalyst device 14. For this purpose, if all the pre-set conditions have been satisfied, the engine control section 2 judges the state of the catalyst device 154 continuously, while, otherwise, it leaps to step S104 of FIG. 2A, in which a judgment is made as to whether conditions for judging the states of the catalyst device 14 and the first oxygen content sensing section 15 are satisfied.

Now the operation of judging the normal state of the catalyst device 14 by varying the state of the air fuel ratio by means of the virtual oxygen content sensing signals IMO2 will be described referring to FIGS. 3B to 3E.

First, the operation of judging the state of the catalyst device 14 by utilizing the virtual oxygen content sensing signals representing the normal state of the air fuel ratio will be described referring to FIG. 3B.

After elapsing of a pre-set time, when the air fuel ratio feedback operation is carried out in accordance with the virtual oxygen content sensing signals IMO2 showing the normal state of the air fuel ratio, the engine control section 2 reads the signals of the second oxygen content sensing section 16 to generate second oxygen content sensing signals RREO2 (S2131). Further, the engine control section 2 makes a judgment as to whether the second oxygen content sensing signals RRO2 are within a pre-set range, i.e., less than a first pre-set value B1 and more than a second pre-set value B2 (S2132).

If the second oxygen content sensing signals RREO2 come within the pre-set range, the engine control section 2 judges that the second oxygen content sensing section 16 is in the normal state, thereby decrementing the current error occurrence times by "1" (S2133).

Figure 3A:
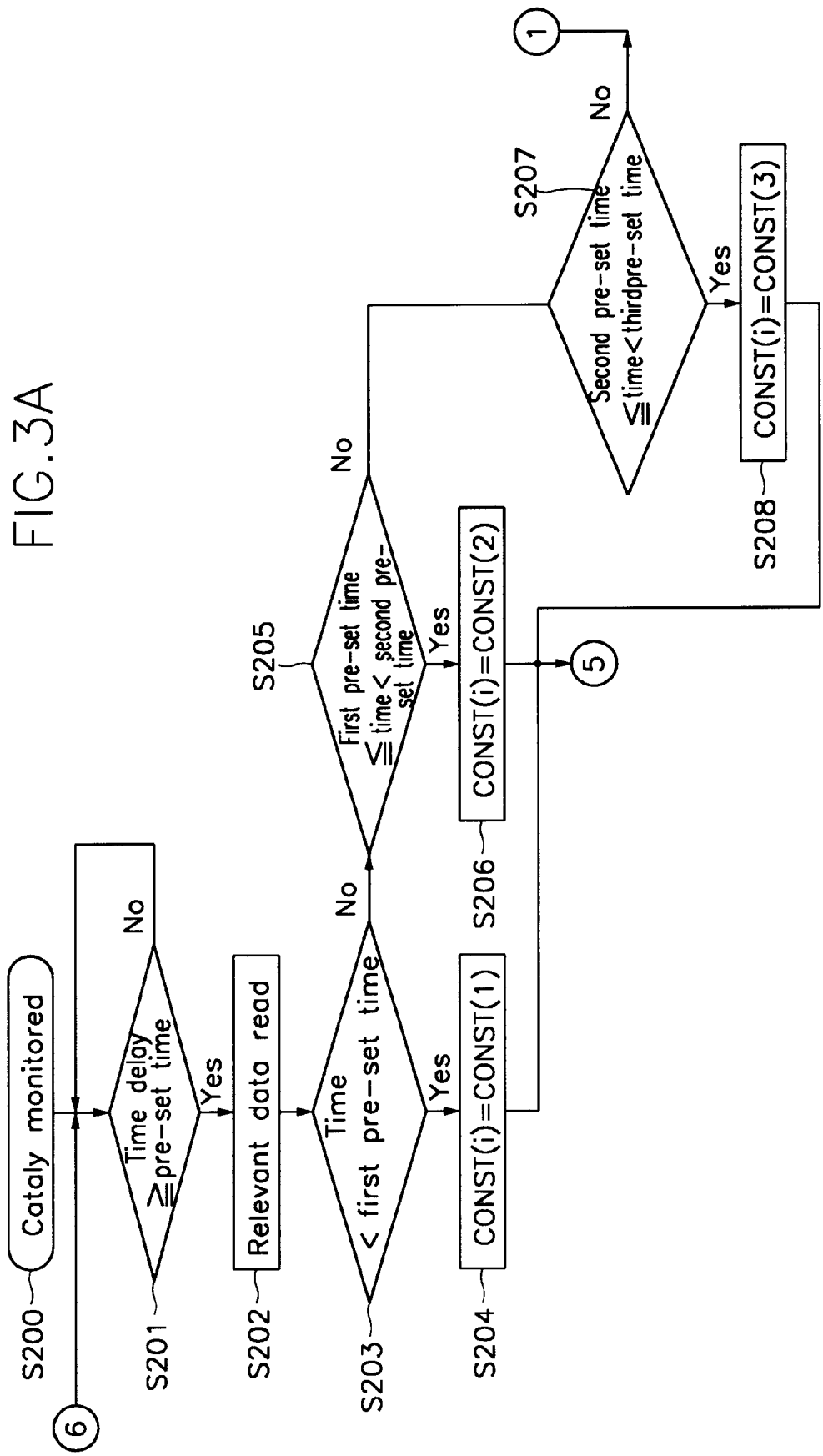
Figure 3B:
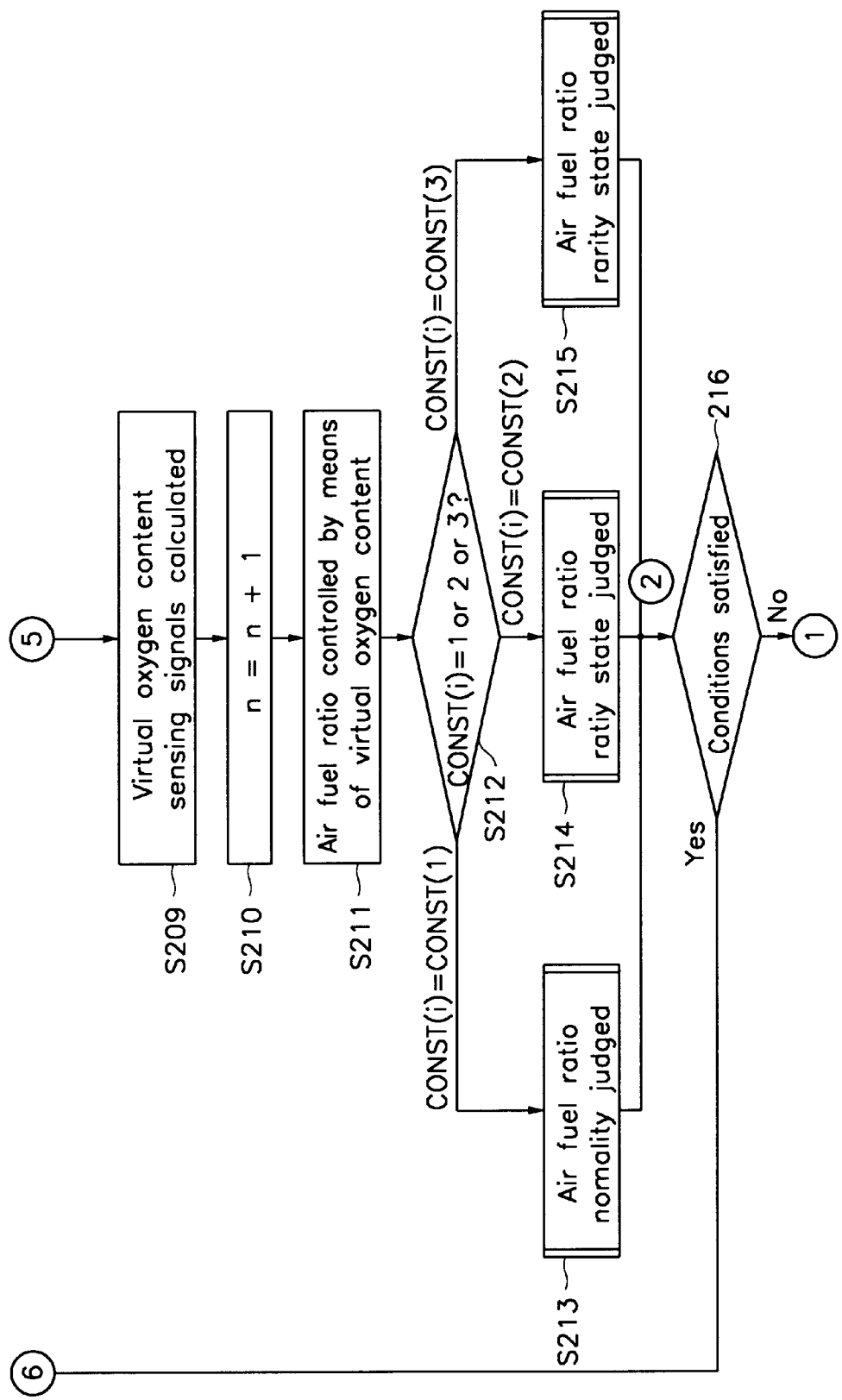

If the decremented error occurrence times is less than or equal to "0" (S2134), the engine control section 2 sets the error occurrence times to "0" (S2135), and makes a judgment as to whether the operation judging conditions for the catalyst device 14 of FIG. 3A are satisfied (S104).

However, if the second oxygen content sensing signals RREO2 do not satisfy the pre-set conditions, the engine control section 2 increments the current error occurrence times by "1" (S2136). Then, the engine control section 2 makes a judgment as to whether the error occurrence times is larger than or equal to the pre-set value (S2137). If it is larger than or equal to the pre-set value, the engine control section 2 determines that an abnormality has occurred, and therefore, activates the warning device 3 (S2183).

However, otherwise, a judgment is made as to whether the operation judgment conditions for the catalyst device 14 of FIG. 3A are satisfied (S104).

Figure 3C:
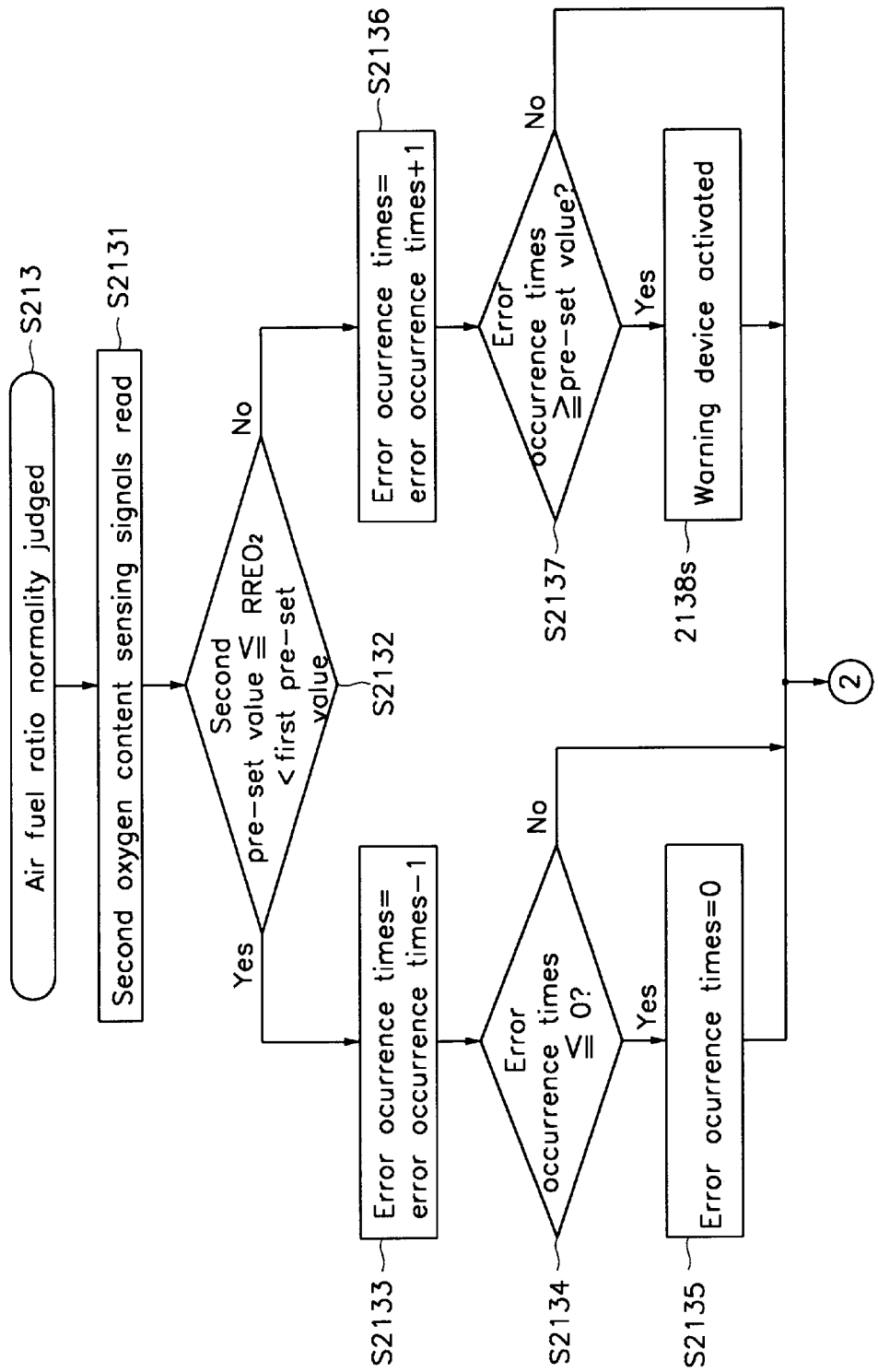

Then if it is found that the air fuel ratio is in a profusion state by varying the signal level of the virtual oxygen content sensing signals IMO2, a judgment is made based on the method of FIG. 3C as to whether an abnormality has occurred to the catalyst device 14.

Figure 3D:
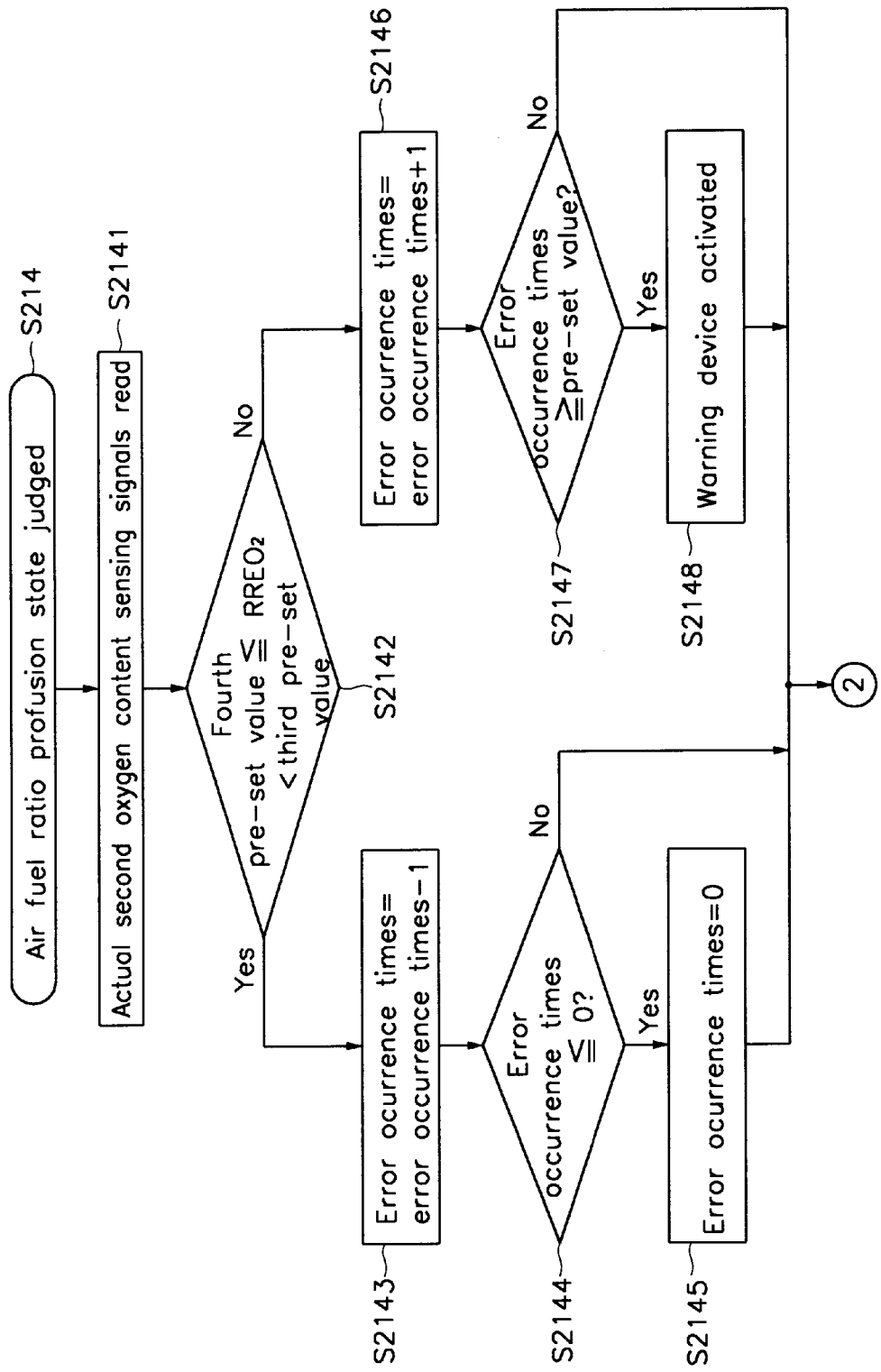

After the elapsing of the pre-set time, when a feedback control operation is carried out in accordance with the virtual oxygen content sensing signals IMO2 in which the air fuel ratio has been shifted to a profusion state, the engine control section 2 reads the signals of the second oxygen content sensing section 16 in FIG. 3D so as to calculate the second oxygen content sensing signals RREO2 (S2141). Then the engine control section 2 determines whether the value of the second oxygen content sensing signals RREO2 is larger than or equal to a fourth pre-set value B4, and whether the mentioned value is smaller than or equal to a third pre-set value B4 (S2142).

If the second oxygen content sensing signals RREO2 come within the pre-set range, the engine control section 2 judges that the second oxygen content sensing section 16 is in the normal state based on the method in which the air fuel ratio is in the normal state. Then the engine control section 2 decrements the current error occurrence times by "1" (S2143).

If the decremented error occurrence times is equal to or smaller than "0", the engine control section sets the error occurrence times to "0" (S2145), and then, determines whether the operation conditions for the catalyst device 14 of FIG. 3A are satisfied (S104).

If the second oxygen content sensing signals RREO2 do not satisfy the pre-set conditions, the engine control section 2 increments the current error occurrence times by "1", and makes a judgment as to whether the error occurrence times is larger than or equal to the pre-set value (S2147).

Figure 2A:
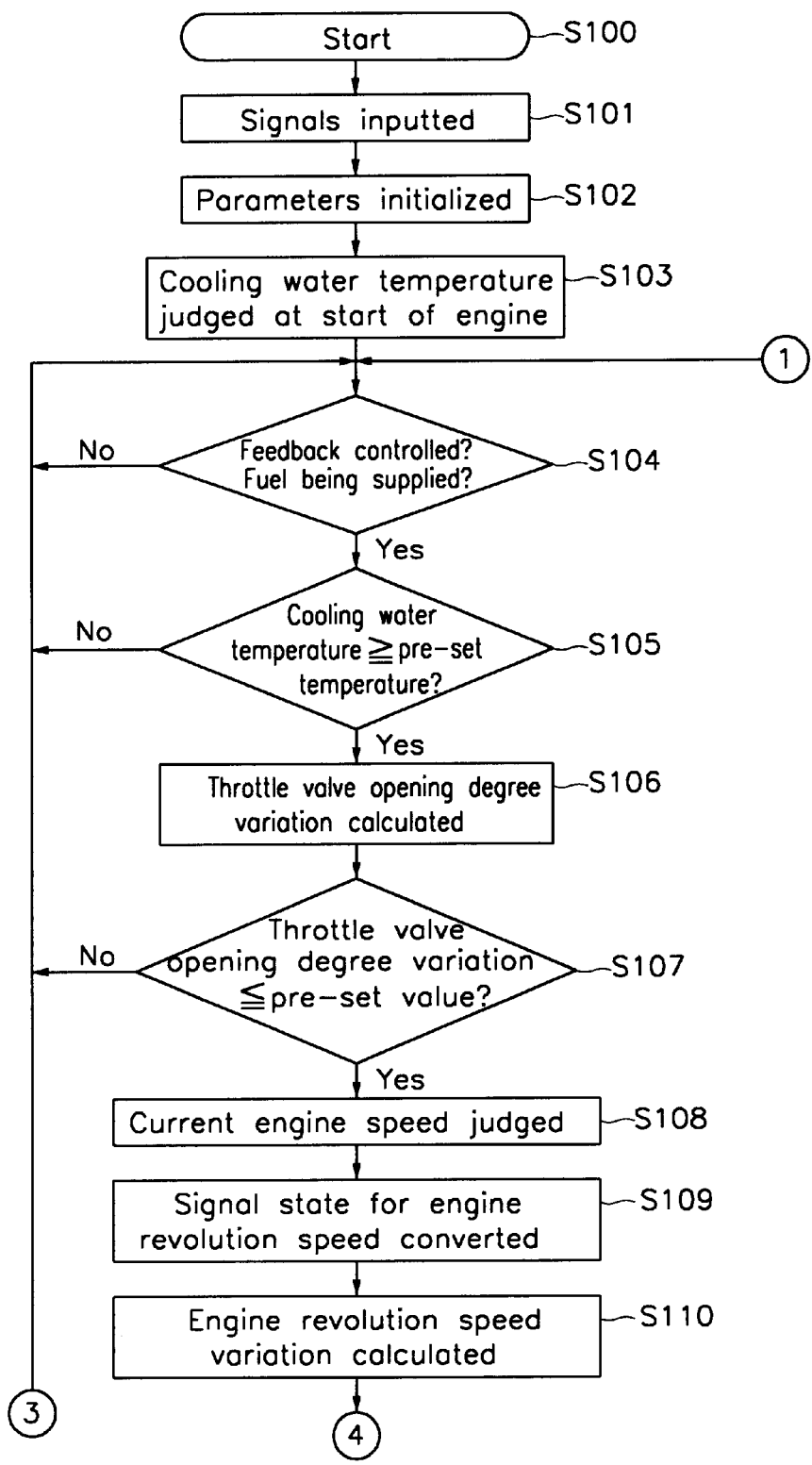
FIGS. 2A and 2B are flow charts showing the main operation for judging the catalyst device and the oxygen content sensing device by utilizing the virtual signals according to the present invention.
Figure 2B:
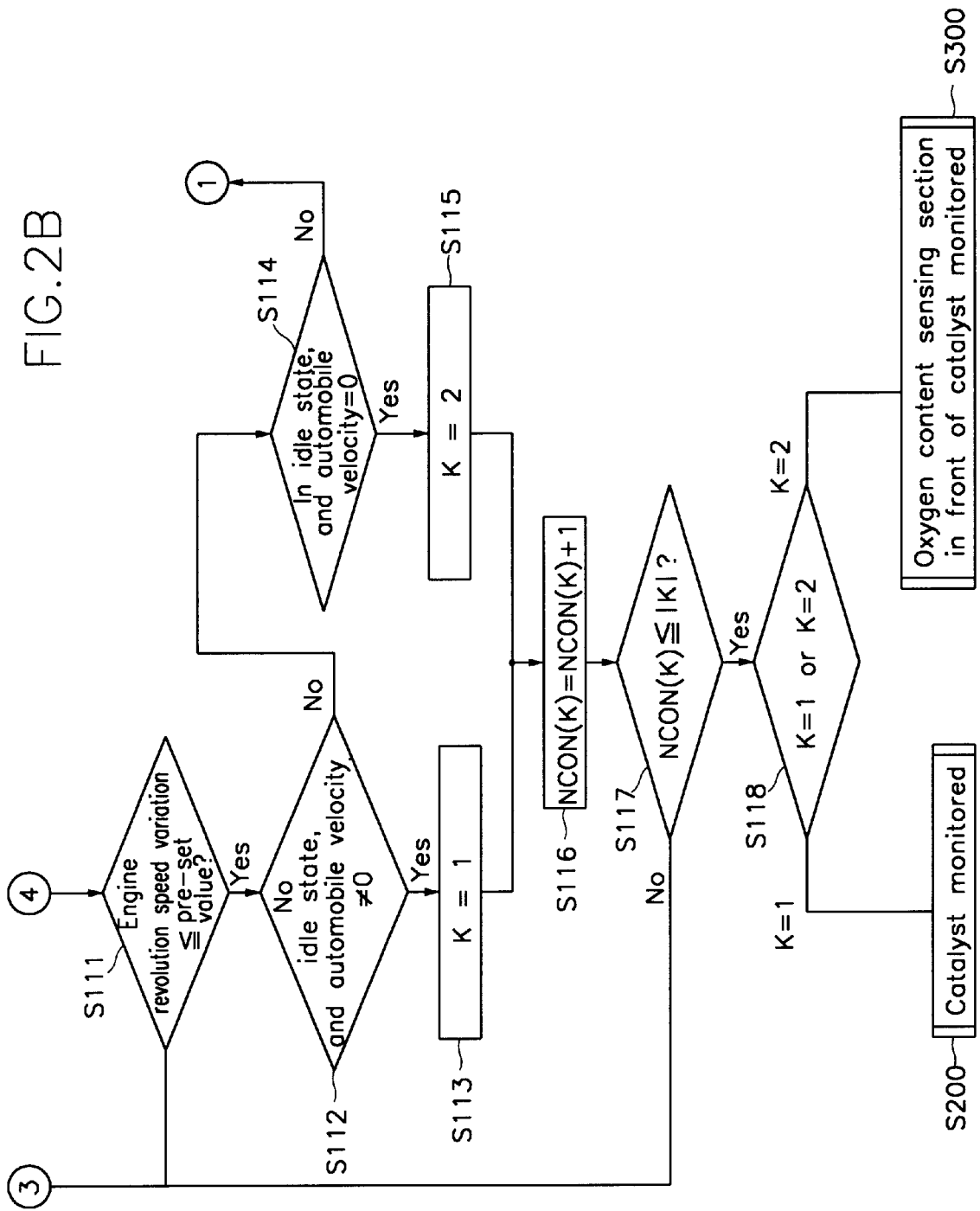

If the pre-set conditions are satisfied, the engine control section 2 judges that the catalyst device 14 has an abnormality, and therefore, activates the warning device 3 (S2148). Otherwise, the engine control section 2 determines whether the operation conditions for the catalyst device 14 of FIG. 2A are satisfied (S104).

Meanwhile, if the state of the air fuel ratio is shifted to a rarity state, the engine control section 2 carries out judgments in the manner described above as shown in FIG. 3E. That is, after elapsing of a pre-set time, if the second oxygen content sensing signals RREO2 exist between a sixth pre-set value B6 and a fifth pre-set value B5 (S2152), the engine control section judges that the catalyst device 14 is in the normal state. Therefore, the error occurrence times is adjusted (S2153–S2155), and a judgment is made as to whether the operation conditions for the catalyst device 14 of FIG. 3A are satisfied (S104).

If the second oxygen content sensing signals RREO2 do not come within the pre-set range (S2152), the engine control section 2 increments the error occurrence times by "1" (S2156). If the error occurrence times is more than the pre-set value (S2157), the engine control section 2 judges that the catalyst device 14 has an abnormality, and therefore, activates the warning device 3 (S2158). Otherwise, a judgment is made as to whether the operation judging conditions for the catalyst device 14 of FIG. 3A are satisfied (S104).

Based on the time variation, the air fuel feedback control operation is carried out in accordance with the shifted state of the air fuel ratio and by varying the level of the virtual oxygen content sensing signals IMO2. During this operation, when the level of the virtual oxygen content sensing signals IMO2 is varied, if the catalyst device 14 operates in the normal manner, the engine control section 2 sets the level of the output signals of the second oxygen content sensing section 16.

Therefore, the signals of the second oxygen content sensing section 16, which are outputted in accordance with the feedback control operations of the virtual oxygen content sensing signals IMO2, are compared with the pre-set signal level, so that the normality of the catalyst device 14 can be judged.

Figure 4A:
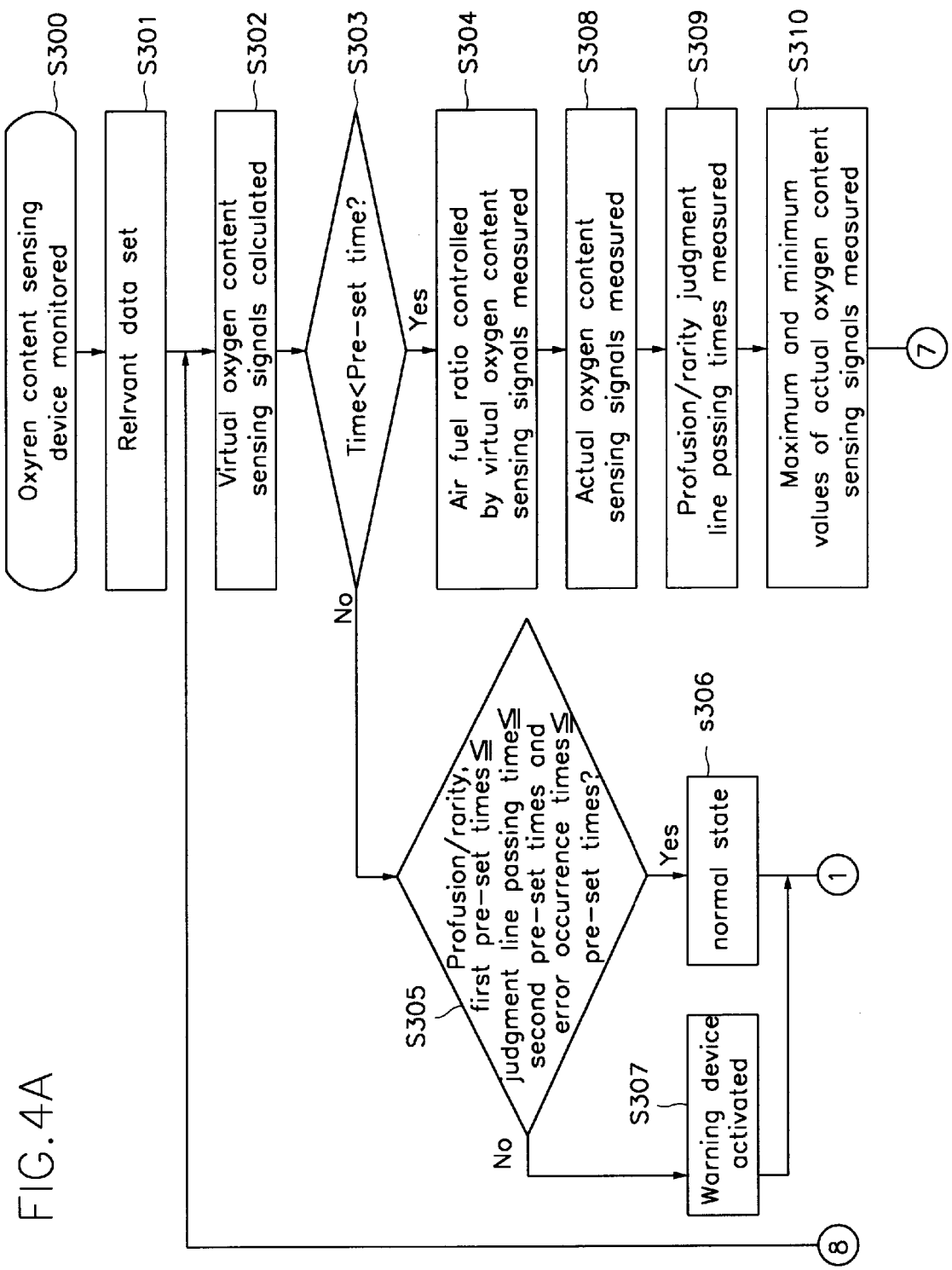
FIGS. 4A and 4B are flow charts showing the method for judging the deterioration of the oxygen content sensing device by utilizing the virtual signals according to the present invention.
Figure 4B:
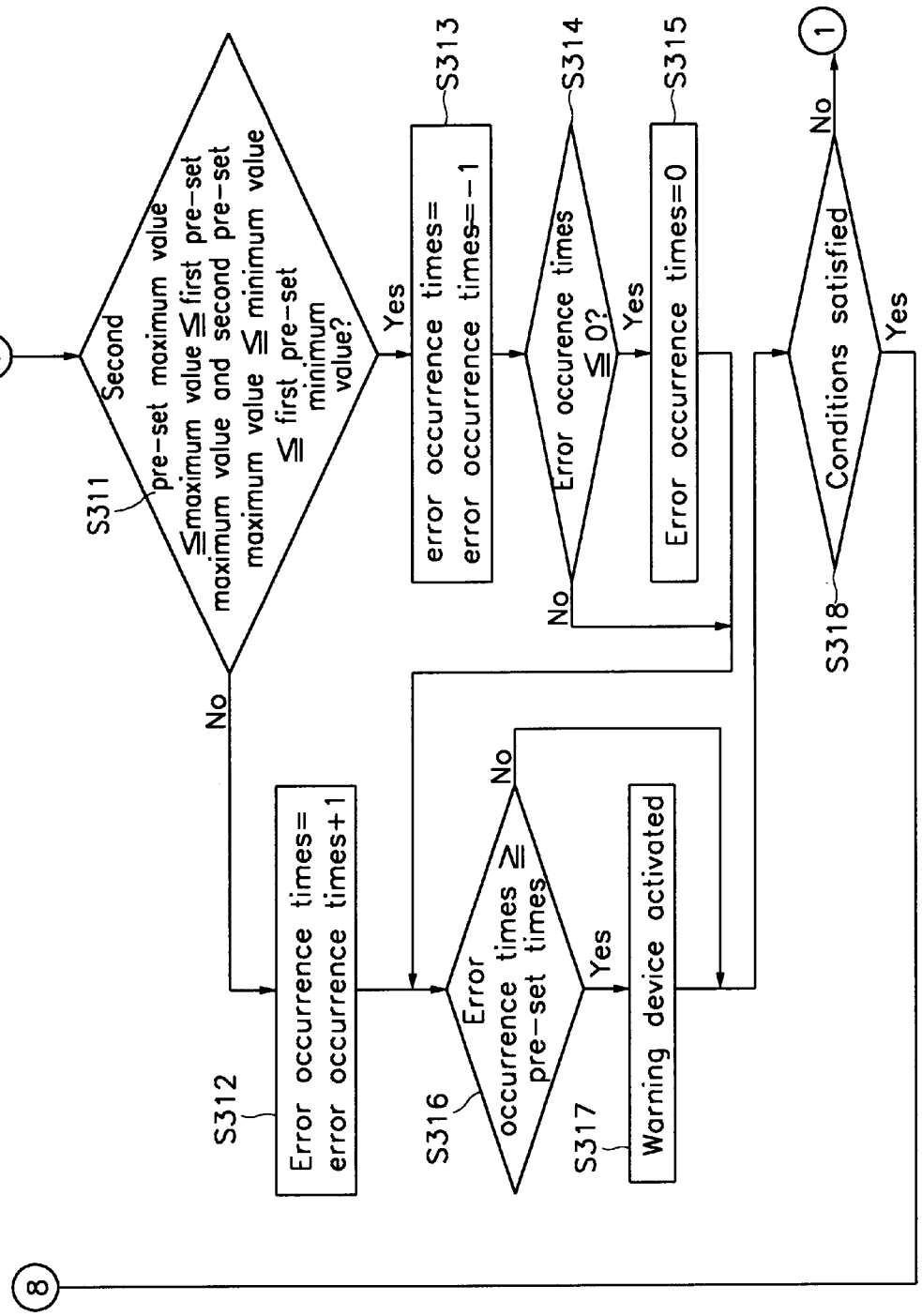

Now the case in which the automobile running conditions satisfy the conditions for judging the operation state of the first oxygen content sensing section 15 will be described referring to FIGS. 4A and 4B.

First, in accordance with the engine revolution speed and the engine load which are judged by the engine revolution speed sensing section 11, the engine control section 2 utilizes the already stored data to determine the amplitude AM and the frequency Hz, and to read the output signals of the first oxygen content sensing section 15 (S301).

Then the engine control section 2 utilizes Formula 3 to calculate the virtual oxygen content sensing signals IMO2 of the first oxygen content sensing section 15 (S302).

$$IMO2 = AM \times \sin(Hz \times n) + CONST(1) \qquad (3)$$

where AM: amplitude,

Hz: frequency, n: time variable, and

CONST(1): the air fuel ratio profusion/rarity adjustment parameter.

As can be seen in Formula 3 above, the value of the air fuel ratio profusion/rarity adjustment parameter CONST(i) is set to CONST(1). Therefore, the virtual signals IMO2 which are calculated for the time period set by the CONST (1) are compared with actual first oxygen content sensing signals RFO2 by the engine control section 2, thereby judging the deterioration state of the first oxygen content sensing section 15.

After calculating the virtual oxygen content sensing signals IMO2 in the above described manner, the engine control section 2 makes a judgment as to whether the time set for judging on the state of the first oxygen content sensing section 15 has elapsed (S303).

If the pre-set time has not elapsed, the engine control section 2 utilizes the calculated virtual oxygen content sensing signals IMO2 to carry out an air fuel ratio feedback control operation (S304). When the feedback control operation is carried out by utilizing the virtual oxygen content sensing signals IMO2, actual oxygen content sensing signals RFO2 are generated (S308).

When the feedback control operation is carried out by utilizing the virtual oxygen content sensing signals IMO2, the engine control section 2 measures a judgment line passing times RLCONT (S309) for determining the profusion/rarity of the air fuel ratio based on the actual oxygen content sensing signals RFO2 (S309).

Then, the engine control section 2 determines the minimum value RFLPK(i) and the maximum value RFRPK(i) of the actual oxygen content sensing signals RFO2 (S310).

Then, in order to judge the deterioration state of the first oxygen content sensing section 15, the engine control section 2 makes judgments as to whether all the minimum values RFLPK(i) of the actual oxygen content sensing signals RFO2 exist between a first pre-set minimum value and a second pre-set minim value, and whether all the maximum values RFRPK(i) exist between a first pre-est maximum value and a second pre-set maximum value (S311).

Therefore, if all the maximum values RFRPK(i) and all the minimum values RFLPK(i) come within the pre-set ranges, then the engine control section 2 decrements the error occurrence times of the oxygen content sensing section by "1" (S313), and determines whether the error occurrence times is equal to or smaller than "0" (S315).

If the error occurrence times is smaller than or equal to "0", the engine control section 2 sets the error occurrence times to "0". If it is not smaller than "0", the error occurrence times is compared with the pre-set value (S316), thereby judging the state of the first oxygen content sensing section 15.

If the error occurrence times exceeds the pre-set value, the engine control section 2 judges that an abnormality has occurred in the first oxygen content sensing section 15, and activates the warning device 3 (S317). Then the engine control section 2 determines whether the pre-set conditions for judging the state of the first oxygen content sensing section 15 are satisfied (S318).

However, if any one among the maximum values RFRPK (i) and the minimum values RFLPK(i) of the actual oxygen sensing signals does not come within the pre-set range, then the engine control section 2 increments the error occurrence times by "1" (S312), and makes a judgment as to whether the incremented error occurrence times is equal to or larger than the pre-set value (S316).

If the error occurrence times is larger than or equal to the pre-set value, the engine control section 2 activates the warning device 3 (S317), and warns the driver against the fact that the first oxygen content sensing section 15 which makes it possible to judge the state of the air fuel ratio and to carry out a feedback operation has been deteriorated, and that the normal operation is impossible.

If the error occurrence times is smaller than the pre-set value, the engine control section 2 determines whether the pre-set conditions for judging the state of the first oxygen content sensing section 15 are satisfied (S318).

If these pre-set conditions are satisfied, the engine control section 2 judges on the deterioration state of the first oxygen content sensing section 15. Otherwise, the system leaps to the operation condition judging step S104 of FIG. 2A.

When the time which is set for judging the state of the first oxygen content sensing section 15 has elapsed, the engine control section 2 determines whether the passing times RLCONT of the profusion/rarity state judging line exists within pre-set ranges C1 and C2, and whether the error occurrence times is smaller than the pre-set value (S305). If the pre-set conditions are satisfied, the engine control section 2 judges that the air fuel ratio feedback control operation is being carried out in the first oxygen content sensing section 15 in the normal manner (S306).

If the above pre-set conditions are not satisfied, the engine control section 2 judges that the first oxygen content sensing section 15 has been deteriorated, so that it cannot carry out the normal operation (S307).

The engine control section 2 carries out the air fuel feedback control operation by utilizing the virtual oxygen content sensing signals IMO2 which are calculated during the pre-set time at step S303. Further, the engine control section 2 compares the calculated virtual oxygen content sensing signals IMO2 with the actual oxygen content sensing signals RFO2. Thus only if the actual oxygen content sensing signals RFO2 are within the pre-set range, the engine control section judges that the oxygen content sensing section 15 which is utilized for controlling the air fuel ratio feedback is normal.

Therefore, in the case where an abnormality occurs in the first oxygen content sensing section 15, the driver of an automobile can quickly recognize it. Therefore, there can be solved the problem such that the oxygen content of the exhaust gas cannot be accurately perceived, and that the air fuel ratio feedback control operation cannot be accurately carried out.

If the pre-set conditions are satisfied during the judgments on the states of the catalyst device 14 and the first oxygen content sensing section 15, then the state judging operation is immediately stopped.

According to the present invention as described above, the deterioration states of the catalyst device and the oxygen content sensing section are judged in accordance with the state of the automobile by utilizing the virtual oxygen content sensing signals which are calculated based on the pre-set data. Therefore, there can be solved the conventional problem such that an abnormality occurs in the oxygen content sensing section which is disposed in front of the catalyst device, and that therefore the deterioration state of the catalyst device cannot be perceived.

Further, after all the devices of the automobile are sufficiently warmed up in accordance with the engine cooling water temperature at the start of the engine, the catalyst device and the oxygen content sensing device are judged. That is, the satisfaction times for the operation state judging conditions are set in advance, and therefore, the deterioration states of the catalyst device and the oxygen content sensing device can be accurately judged regardless of the ambient temperature.

Further, during the deterioration judging operation, the virtual oxygen content sensing signals are utilized to carry out the air fuel ratio feedback control operation. Therefore, even during the deterioration judging operation, the automobile operation can be controlled with an accurate air fuel ratio suitable for the running of the automobile.

Thus, according to the present invention, the states of the catalyst device and the oxygen content sensing device can be judged based on a method which is quite different from the conventional method. Therefore, the product is provided with a unique feature in which the incurred expenses can be saved to a great degree.

What is claimed is:

1. An apparatus for judging deterioration of a catalyst device, comprising:

a cooling water temperature sensing means for sensing a cooling water temperature and outputting the second temperature in a form of electrical signals;

throttle valve opening degree sensing means for sensing a throttle opening degree to outputting the sensed throttle opening degree in a form of electrical signals;

engine revolution speed sensing means for sensing an engine revolution speed and outputting the sensed engine revolution speed in a form of electrical signals;

a catalyst device for purifying harmful exhaust gases discharged through an exhaustion tube into non-harmful gases based on oxidizing and reducing reactions;

oxygen content sensing means installed on an exhaust tube behind said catalyst device for judging a deterioration of said catalyst device, and for sensing an oxygen content of the exhaust gas which has passed through the catalyst device and outputting the oxygen content in a form of electrical signals;

automobile velocity sensing means for sensing an automobile velocity and outputting the sensed velocity as electrical signals relevant to the automobile velocity;

an idle switch for sensing an idle state of an engine and outputting the sensed idle state in a form of electrical signals;

engine control means for reading the electrical signals supplied from said sensing means and from said idle switch, and for judging an initial engine cooling water temperature, to judge as to whether an automobile state satisfies pre-set conditions throughout pre-set times, and to judge on an operating state of said catalyst device by utilizing the electrical signals of said oxygen content sensing means and virtual oxygen content sensing signals based on pre-set data in accordance with an automobile running state; and warning means, connected to said engine control means, for responding to signals outputted in accordance with an operating state of said catalyst device.

2. The apparatus as claimed in claim 1, wherein setting conditions for the pre-set data for said engine control means are:

when an air fuel ratio feedback control operation is being carried out;

when said cooling water temperature is less than a pre-set value;

when a variation rate of said throttle valve opening degree is less than a pre-set value;

when variation rates of said cooling water temperature and said engine revolution speed at start of engine are less than pre-set values;

when the pre-set conditions are satisfied as much as required times which is set based on temperature; and when the engine is not in an idle state, and when running speed is not "0".

3. The apparatus as claimed in claim 2, wherein the variation rate of said engine revolution speed is calculated based on a formula of:

engine revolution speed=FC/256×(engine revolution speed at current stage−engine revolution speed at preceding stage)+engine revolution speed at preceding stage, where FC represents a filter constant.

4. The apparatus as claimed in claim 1, wherein said engine control means calculates said virtual oxygen content sensing signals based on a formula of:

virtual oxygen content sensing signals=AM× sin (Hz×$n$)+CONST($i$)

where AM: amplitude of the signals set in accordance with an automobile state,

Hz: frequency of the signals set in accordance with the automobile state, n: a time variable, CONST(i): an air fuel ratio profusion/rarity adjustment parameter.

5. A method for judging deterioration of a catalyst device, comprising the steps of:

setting profusion and rarity adjusting parameters for an air fuel ratio by judging an elapsed time to judge a state of a catalyst device, and judging on amplitudes and frequencies of signals based on data set in accordance with a state of an automobile;

calculating virtual oxygen content sensing signals relevant to a pre-set period of time by utilizing a pre-set value;

judging air fuel ratio profusion/rarity adjusting parameters, to determine whether a state of an air fuel ratio is in a normal range, in profusion or in rarity; and judging actual oxygen content sensing signals of an oxygen content sensing means, and judging as to whether a range of the actual oxygen content sensing signals exists within a range set in accordance with a state of said air fuel ratio, to decrement a number of error occurrences by "1" if it exists within the pre-set range, and to increment the number of error occurrences by "1" if it is not within the range.

6. The method as claimed in claim 5, wherein: if said profusion/rarity adjustment parameter for said air fuel ratio is CONST(i), said air fuel ratio of said virtual oxygen content sensing signals is in a normal state; if it is CONST (2), said air fuel ratio of said virtual oxygen content sensing signals is shifted to a profusion state; and if it is CONST(3), said air fuel ratio of said virtual oxygen content sensing signals is shifted to a rarity state.

7. The method as claimed in claim 5, wherein said virtual oxygen content sensing signals are calculated based on a formula of:

virtual oxygen content sensing signals=AM× sin (Hz×$n$)+CONST($i$)

where AM: amplitude of the signals set in accordance with an automobile state,

Hz: frequency of the signals set in accordance with the automobile state, n: a time variable, CONST(i): an air fuel ratio profusion/rarity adjustment parameter.

8. An apparatus for judging deterioration of an oxygen content sensing device, comprising:

cooling water temperature sensing means for sensing a cooling water temperature and outputting the second cooling water temperature in a form of electrical signals;

throttle valve opening degree sensing means for sensing a throttle valve opening degree and outputting the sensing a throttle valve opening in a form of electrical signals;

engine revolution speed sensing means for sensing an engine revolution speed to outputting the sensed engine revolution speed in a form of electrical signals;

a catalyst device for purifying harmful exhaustion gases discharged through an exhaustion tube into non-harmful gases based on oxidizing and reducing reactions;

oxygen content sensing means installed on a discharge tube in front of said catalyst device, for outputting relevant electrical signals by sensing an oxygen content of exhaust gases for an air fuel ratio feedback control operation;

automobile velocity sensing means for sensing an automobile velocity and electrical signals relevant to said automobile velocity;

an idle switch for sensing an idle state of an engine and outputting the sensed idle state in a form of electrical signals;

engine control means for reading the electrical signals supplied from said sensing means and from said idle switch, and for judging an initial engine cooling water temperature, to judge as to whether an automobile state satisfies pre-set conditions throughout pre-set times, and to judge an operating state of said oxygen content sensing means by utilizing the electrical signals of said oxygen content sensing means and calculated virtual oxygen content sensing signals based on pre-set data in accordance with an automobile running state; and warning means connected to the engine control means for responding to signals outputted in accordance with an operating state of said oxygen content sensing means.

9. The apparatus as claimed in claim 8, wherein setting conditions for the pre-set data for said engine control means are:

when an air fuel ratio feedback control operation is being carried out;

when said cooling water temperature is less than a pre-set value;

when a variation rate of said throttle valve opening degree is less than a pre-set value;

when variation rates of said cooling water temperature and said engine revolution speed at start of engine are less than pre-set values;

when the pre-set conditions are satisfied as much as required times which are set based on temperature; and when an engine is in an idle state, and when a running speed is "0".

10. The apparatus as claimed in claim 8, wherein a variation rate of said engine revolution speed is calculated based on a formula of:

engine revolution speed FC/256×(engine revolution speed at current stage−engine revolution speed at preceding stage)+engine revolution speed at preceding stage, where FC represents a filter constant.

11. The apparatus as claimed in claim 8, wherein said engine control means calculates said virtual oxygen content sensing signals based on a formula of:

virtual oxygen content sensing signals=AM× sin (Hz×n)+CONST(i)

where AM: amplitude of the signals set in accordance with an automobile state,
Hz: frequency of the signals set in accordance with the automobile state,
n: a time variable,
CONST(i): an air fuel ratio profusion/rarity adjustment parameter.

12. The apparatus as claimed in claim 11, wherein said air fuel ratio profusion/rarity adjustment parameter CONST(i) is a constant.

13. A method for judging a deterioration state of an oxygen content sensing means, comprising the steps of:

setting profuse and rarity adjusting parameters for an air fuel ratio, and setting amplitudes and frequencies of signals based on data set in accordance with a state of an automobile;

setting relevant oxygen content sensing signals by utilizing pre-set signals if a preset time has not passed, and judging on an operation state of an oxygen content sensing means, if said pre-set time has passed, a passing number of an air fuel ratio profusion and rarity judging line of said oxygen content sensing signals being within a pre-set range;

executing an air fuel ratio feedback control by utilizing pre-set virtual oxygen content sensing signals, and measuring signals outputted from said oxygen content sensing means;

measuring the passing number of times of the air fuel ratio profusion and rarity judging line of said oxygen content sensing signals, and measuring a maximum value and a minimum value of said oxygen content sensing signals; and judging as to whether the maximum value and the minimum value of said oxygen content sensing signals come within pre-set ranges, decrementing error occurrence times by "1" if the values comes within pre-set ranges, and incrementing the error occurrence times by "1" if the values do not come within said pre-set ranges, whereby said oxygen content sensing means is judged to be in an abnormal state upon finding that the error occurrence times exceeds a pre-set value.

14. The method as claimed in claim 13, wherein said virtual oxygen content sensing signals are calculated based on a formula of:

virtual oxygen content sensing signals=AM× sin (Hz×n)+CONST(i)

where AM: amplitude of the signals set in accordance with an automobile state,
Hz: frequency of the signals set in accordance with the automobile state,
n: a time variable,
CONST(i): an air fuel ratio profusion/rarity adjustment parameter.

15. The apparatus as claimed in claim 14, wherein said air fuel ratio profusion/rarity adjustment parameter CONST(i) is a constant.

16. A method for judging deterioration states of an oxygen content sensing means and a catalyst device, comprising the steps of:

judging an engine revolution speed and load state of an engine;

calculating virtual oxygen content sensing signals based upon the engine revolution speed and the load state of the engine;

performing an air fuel ratio feed back operation in accordance with the virtual oxygen content sensing signals;

determining a deterioration state of a catalyst device by utilizing a first oxygen content sensing section disposed at an output of the catalyst; and determining a deterioration state of a second oxygen content sensing section disposed at an input of the catalyst by comparing the virtual oxygen content sensing signals with signals of the second oxygen content sensing section.

17. The method of claim 16, further comprising the step of activating a warning device in response to at least one of a deterioration state of the catalyst device and deterioration of said second oxygen content sensing section.

18. A system for judging deterioration states of an oxygen content sensing means and a catalyst device, comprising:

an engine;

a catalyst device being operatively linked to said engine;

a first oxygen content sensing means being disposed at an output of said catalyst device;

a second oxygen content sensing means being disposed at an input of said catalyst device;

engine revolution speed sensing means being operatively linked to said engine;

engine load sensing means being operatively linked to said engine; and engine control means being operatively linked to said first and second oxygen content sensing means, said engine control means being operatively linked to said engine load sensing means and said engine revolution speed sensing means, said engine control means calculating virtual oxygen content sensing signals based upon signals from said engine revolution speed sensing means and said engine load sensing means, said engine control means controlling an air fuel ratio feed back operation for said engine in accordance with the virtual oxygen content sensing signals, said engine control means determining a deterioration state of said catalyst device by utilizing said first oxygen content sensing means, said engine control means determining a deterioration state of said second oxygen content sensing means by comparing the virtual oxygen content sensing signals with signals of said second oxygen content sensing means.

19. The system of claim 18, further comprising warning means, connected to said engine control means, for responding to signals outputted in accordance with an operating state of at least one of said catalyst device and said second oxygen content sensing means.

* * * * *